United States Patent [19]

Bedford, Jr. et al.

[11] Patent Number: 6,123,006
[45] Date of Patent: Sep. 26, 2000

[54] RETROFIT EXTENDED VISION MODULE FOR WEAPON SYSTEM OPTICAL SIGHT

[75] Inventors: Ben C. Bedford, Jr., Huntsville, Ala.; Allie M. Baker, Cypress, Calif.

[73] Assignee: Recon/Optical, Inc.

[21] Appl. No.: 09/114,333

[22] Filed: Jul. 13, 1998

[51] Int. Cl.[7] .................................................. F41G 3/22
[52] U.S. Cl. ...................... 89/41.06; 89/41.19; 89/41.22; 33/235
[58] Field of Search ................................ 89/41.05, 41.06, 89/41.19, 41.22; 235/404; 33/235

[56] References Cited

U.S. PATENT DOCUMENTS

| | | | |
|---|---|---|---|
| 2,950,340 | 8/1960 | Compton et al. | 33/235 |
| 3,997,762 | 12/1976 | Ritchie et al. | 89/41.05 |
| 4,318,330 | 3/1982 | Hausenblas | 89/41.05 |
| 4,418,361 | 11/1983 | Bagnall-Wild et al. | 89/41.05 |
| 4,760,770 | 8/1988 | Bagnall-Wild et al. | 89/41.19 |
| 4,777,861 | 10/1988 | Lecuyer et al. | 89/41.17 |
| 5,129,309 | 7/1992 | Lecuyer | 89/41.06 |
| 5,200,827 | 4/1993 | Hanson et al. | 89/41.05 |
| 5,530,246 | 6/1996 | Hawkins | 89/41.06 |

FOREIGN PATENT DOCUMENTS 3405015  8/1985  Germany .............................. 89/41.05

*Primary Examiner*—Stephen M. Johnson
*Attorney, Agent, or Firm*—McDonnell Boehner Hulbert & Berghoff

[57] ABSTRACT

An optical sight for a weapon system is upgraded with a retrofit module that provides both gunner sighting at the eyepiece and video transmission of the image the gunner sees to a remote location such as, for example, the helmet display of the commander for the weapon system. The video image may be used for both fire control as well as training of the gunner. The retrofit module is adaptable to most types of sighting systems.

23 Claims, 3 Drawing Sheets

RETROFIT EXTENDED VISION MODULE FOR WEAPON SYSTEM OPTICAL SIGHT

BACKGROUND OF THE INVENTION

1. Field of the Invention

This invention relates generally to the field of optical sights, such as are found in military weapon systems. More particularly, the invention relates to a module that retrofits onto an existing optical sight and provides both an optical sight channel for a gunner operating the weapon and a video channel for conveying the image that the gunner sees through the eyepiece to a port for transmission to a commander or other user at a remote location.

2. Description of Related Art

It is well known in the art to provide a sighting system for a weapon, such as a surface-to-surface or surface-to-air missile. The sighting system typically presents at an eyepiece a missile aiming mark indicating the boresight of the weapon superimposed on the field-of-view of the sight, as well as fire control or missile status information. More recent sights have been developed that incorporate an electronics module and cathode ray tube (CRT), in which the image on the surface of the CRT is also superimposed for view through the eyepiece. The information displayed on the CRT may be virtually anything, including ballistics information, imagery used for training purposes such as enemy tanks or aircraft, etc. Some sighting systems also include laser range finding units and thermal imaging modules that present range and thermal images of the scene to the gunner at the eyepiece.

Prior art sighting systems are described in U.S. Pat. No. 5,530,246 to Hawkins, U.S. Pat. No. 3,997,762 to Ritchie et al., U.S. Pat. No. 4,777,861 to Lecuyer et al., assigned to the assignee of the present invention, and U.S. Pat. No. 5,129,309 also to Lecuyer et al. and assigned to the assignee of the present invention. Each of the above patents is fully incorporated by reference herein.

The above sighting systems are all integrated, stand-alone sighting systems and are not retrofit systems per se, i.e., adapted to be installed in a retrofit fashion on a preexisting optical system. Retrofit sighting systems are known in the art, however, and have been developed by the Applicants' assignee. This prior art system is shown schematically in FIG. 1. With the retrofit vision module 10, prior to installation the sight eyepiece 12 is removed from the sighting system unit 14, and an adapter plate 16 is installed on the unit 14. The vision module 10 is installed on the adapter plate 16 and then the eyepiece 12 is installed on the vision module 10. The vision module includes the main optical channel 20, a beam combining prism arrangement which may be accomplished with a multi-component prism assembly 24, and a second or CRT channel 26. The vision module 10 provides to the gunner at the eyepiece 12 a replica image of the main sight unit image and a superimposed CRT image.

The present invention provides for a more expanded capability than prior art retrofit systems and allows the module to meet more comprehensive military requirements. In addition, by adding the capability of generating a video image of the view seen by the gunner, new possibilities for use of the sighting system and weapon system are presented.

In particular, the present invention provides the gunner with a view of the main sight image from the first channel and a second view, from a second or "CRT" channel, which can be a reticle, a natural picture or scene, or a programmed training image. The nature of the second image in the CRT channel is essentially unlimited. In a normal mission using a prior art sighting system, the gunner can, for example, utilize a special reticle provided in the module for gunnery purposes. However, the commander cannot see the same view which the gunner sees. In an important advantage of the present system, the video channel in the vision module is coupled to a port that conveys a video image of what the gunner sees to the commander so that he can override the gunner's action, if necessary. The commander sees the same view as that of the gunner on a suitable display, such as on a head-mounted display or a flat panel display. The commander override may prevent, for example, casualties due to a friendly fire situation.

The feature of porting the image the gunner sees to the commander has other potential uses besides fire control. For example, the weapon and sighting system may be used for training exercises, with the video of the image the gunner sees used to monitor and help improve the performance of the gunner. In this example, predetermined training imagery may be introduced into the CRT channel and the ability of the gunner to track targets in the training imagery and operate the fire mechanisms for the weapon may be evaluated live or recorded for later evaluation or critique.

In yet another aspect of the invention, the luminous source in the second channel may be a color liquid crystal display (LCD) instead of a CRT. Small CRTs, although they offer a bright image, cannot produce colored imagery without significant loss of resolution. LCD technology offers full-color display of good resolution imagery but at reduced luminance. The LCD image may be highly diluted when superimposed upon a bright main image in the first channel. To overcome this, the invention provides for a variable optical density device or filter in the first optical channel. One example of such a variable optical density filter is an optical glass wheel with varying levels of optical density in the azimuthal direction but constant optical density in the radial direction. Rotation of such a wheel can vary the effective transmission through the main image channel thereby adjusting the relative luminance of the main image versus the LCD image and offer good visibility. Further, the use of such a wheel with a very high optical density region can act as a mechanical shutter. Both the wheel or the shutter, if employed, can also have fail-safe features which allow the images to be seen even if electrical power to the vision module fails.

SUMMARY OF THE INVENTION

An extended vision module is provided for retrofit installation onto an optical sight of a weapon system. The optical sight includes a conventional eyepiece for the gunner, which is removed prior to installation of the retrofit extended vision module. The retrofit extended vision module includes a first optical channel for receiving an input image from the optical sight at the location where the eyepiece is normally located in the optical sight. A composite prism or other equivalent optical combining means is provided for receiving the input image from the first optical channel. A second optical channel is provided in the module and comprises (1) a luminous display device, such as a CRT or liquid crystal display, and (2) a means for directing a luminous image displayed by the display device to the optical combining means or composite prism.

The composite prism combines the input image from the first optical channel and the luminous image from the second optical channel to form a final image. The composite prism further directs the final image to the eyepiece, which has been re-mounted to the retrofit extended vision module.

The composite prism also directs the final image to a third optical channel. The third optical channel comprises (1) a video camera and (2) a lens assembly for forming the final image onto the video camera. The video camera generates a video signal of the final image. The video camera is coupled to an output means or port for enabling transmission of the video signal to a remote location, for example a display or host system used by a commander or trainer for the weapon system.

The retrofit extended vision module further includes a housing or enclosure for the first, second and third optical channels and the composite prism. The housing is adapted for mounting to the optical sight in axial alignment at the location of the eyepiece after removal of the eyepiece from the optical sight. The housing further comprises a suitable aperture or means for receiving the eyepiece such that the final image is focused at the eyepiece.

With the above features of the module, the composite prism simultaneously provides the final image to both an operator of the weapon system at the eyepiece and directs the final image through the video channel, where it is ported to a host viewing system remote from the eyepiece. The performance of the optical sight and weapon system may be improved due to the ability of remote fire control or supervision of operation of the weapon system to be exercised by a person viewing the final image at the same time as the gunner, at a remote location.

In a preferred embodiment of the invention, the luminous display device in the second optical channel can comprise either a cathode ray tube or a liquid crystal display. In the case of the luminous display device being a liquid crystal display or other equivalent device of relatively low luminance, the invention may be practiced by placing an adjustable variable density optical filter in the first optical channel, enabling a user of the sight to adjust the relative luminance of the input image so that the liquid crystal display image is readily observed.

In a preferred embodiment of the invention, the video signal is ported from the retrofit extended vision module to a display worn or observed by a commander of the weapon system. For example, the weapon system may be a vehicle-mounted surface-to-surface or surface-to-air missile launching system and the commander and gunner may be both present in the vehicle. The gunner views the final image at the eyepiece, while the commander views the final image on a helmet mounted display at the same time. The commander may exercise direct fire control override if the gunner is tracking an improper target.

In another possible embodiment, the luminous display device may display training images of potential targets and the performance of the gunner in tracking the targets may be simultaneously monitored by a trainer in the vehicle, or at a remote site. The trainer thus has the capacity to provide instantaneous feedback to the gunner, conduct a performance evaluation of the gunner's capabilities, etc. Additionally, the video may be ported to a video recording or storage device for later evaluation by the gunner, commander, trainer, or other personnel. The video signal may also be transmitted to any remote location for viewing in real time.

In another aspect, the invention is an improved weapon system comprising a missile having an electronics module for generating missile aiming or point of regard information, a sight presenting to a gunner an image of the point of regard of the missile, and a retrofit extended vision module adapted to be installed onto the sight. The retrofit extended vision module is installed at the location where an eyepiece for the sight is normally installed. The module comprises a first channel receiving an input image from the sight, a second channel receiving an image from a luminous source such as a CRT, a combining prism for combining the images from the first and second channels to form a final image, and a third channel comprising a means for generating a video signal of the final image. The retrofit extended vision module provides a video output coupled to camera, the video output allowing the video signal to be displayed at a display of a remote viewing system. The retrofit extended vision module further provides a means for receiving the sight eyepiece for viewing of the final image by an operator of the weapon system. In accordance with the above features, a commander having access to controls for the missile may view the video image on the remote viewing system display and exercise remote fire control over the missile.

These and other features of the invention will be more apparent from the following detailed description of a presently preferred, representative embodiment of the invention.

BRIEF DESCRIPTION OF THE DRAWINGS

Presently preferred and alternative embodiments of the invention will be discussed below in conjunction with the appended drawing figures, wherein like reference numerals refer to like elements in the various views, and wherein.

DETAILED DESCRIPTION

Figure 1:
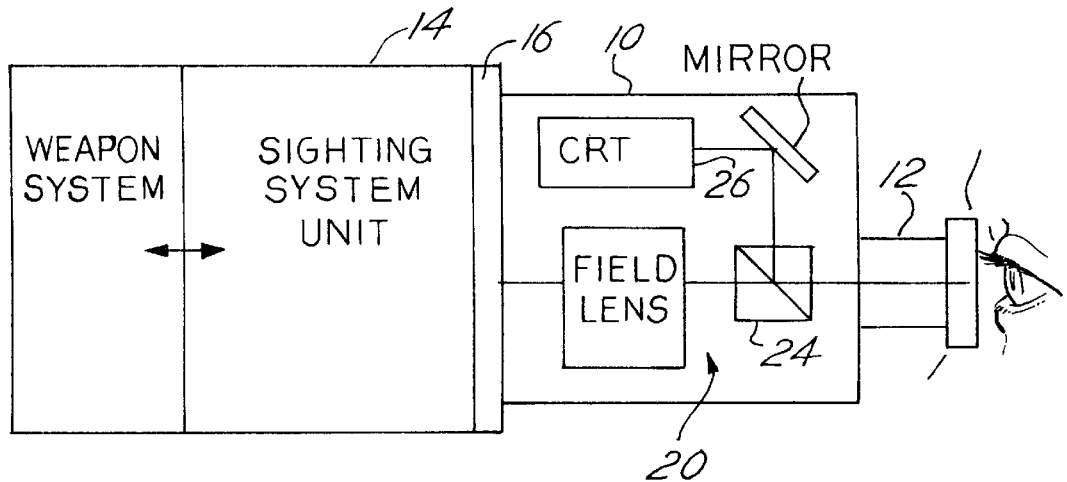
FIG. 1 is a schematic diagram of a prior art retrofit vision module.
Figure 2:
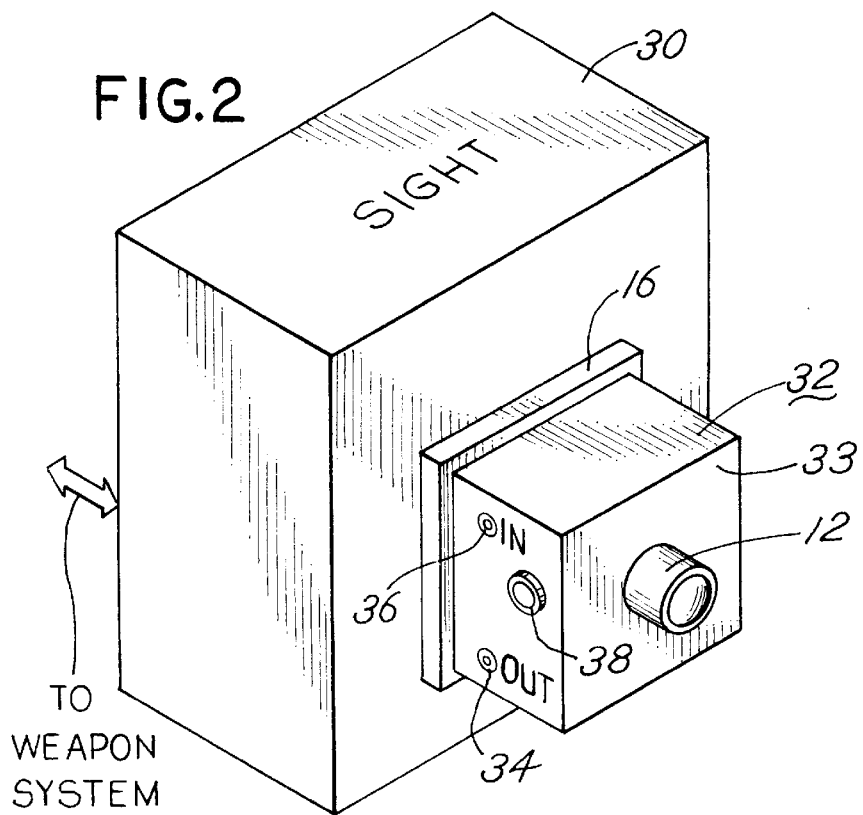
FIG. 2 is a perspective view of a retrofit extended vision module in accordance with one possible embodiment of the invention.

Referring now to FIG. 2, a sight 30 for a weapon system (not shown) having the inventive extended vision module 32 is illustrated. The details of the sight per se 30 are not particularly important and therefore are omitted from the following discussion. However, such details are known to persons skilled in the art. One of the advantages of the present invention is that the extended vision module can be retrofit, with slight modifications, onto a wide variety of preexisting optical systems. There are two primary requirements for satisfactory adaptation of the illustrated embodiment to any generic sighting system: first, the input image surface of the extended vision module 32 must be axially coincident with the final image surface in the existing sight 30 with the existing sight eyepiece removed. Second, the initial field lens assembly of the entrance pupil of the extended vision module may need to be adjusted slightly to re-image the exit pupil of the existing sight properly into the extended vision module. Persons skilled in the art will find these adjustments quite easy to implement. Examples of sighting systems in which the extended vision module works well are the Stinger surface-to-air missile sighting system for the U.S. military, the TOW anti-tank missile sight, the Leopard Thermal Tank Sight, and various surface-to-surface and surface-to-air missile systems installed on the Bradley Fighting Vehicle and like military vehicles.

Referring again to FIG. 2, the extended vision module is mounted to the sight 30 in the following fashion: first, the gunner's eyepiece 12 is removed from the sight 30. Then, the adapter plate 16 for the vision module 32 is mounted in a suitable fashion to the interface surface of the sight. Next, the extended vision module 32 is mounted to the adapter plate 16 such that the optical requirements set forth in the preceding paragraph are observed. Finally, the gunner's eyepiece 12 is reinstalled onto the extended vision module 32 in a suitable eyepiece-receiving structure (not shown).

The extended vision module 32 includes a suitable housing 33 meeting the space constraints of the particular sight installation in question. The housing 33 encloses the optical, electrical and mechanical elements for the extended vision module 32, shown in schematic form in FIG. 3. The housing 33 also includes the following interfaces: an electronics input interface 36 which receives a triaxial cable leading from an electronics assembly (not shown) which supplies CRT or other display signals for the CRT channel in the vision module and a video out port 34. The electronics assembly accepts EIA-STD-RS-170A standard 525-line video or similar format for display to the gunner. Additional operator controls for brightness and fine elevation and azimuth offset may be provided by the electronics assembly. These details are within the ability of a person skilled in the art.

The extended vision module also includes a contrast adjustment knob 38 that is used by the gunner to adjust the luminance of the main input image (described below). For example, in an embodiment of the invention in which the luminous source in the CRT channel is a liquid crystal display, rotation of the knob 38 causes a variable density filter to move into the optical channel to vary the effective transmission of the main input image, thereby increasing the relative luminance of the liquid crystal display image. Remote control capability can be provided to the control mechanism, so that the commander or remote viewer has the ability to make the contrast adjustment in the event that the gunner becomes incapacitated. To accommodate this feature, and other alternate controls for the gunner's sight functions, appropriate electronic communication channels can be incorporated into the extended vision module along with the requisite electronic controls for the variable density filter or other components.

The extended vision module 32 also includes a video output port 34 that is coupled to a video channel in the extended vision module. The video output port 34 receives a suitable cable for transmission of video signals from the camera in the extended vision module 32 to a remote location for storage or display, such as for example at the display for a commander of the weapon system.

Figure 3A:
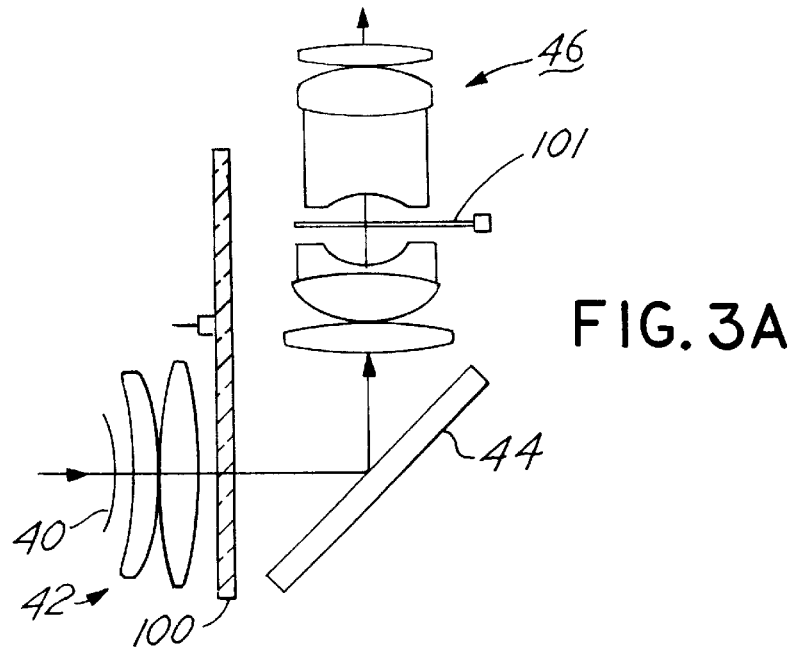
FIG. 3A is a detailed schematic illustration of the main channel of FIG. 3 showing optional places for location of a variable density filter wheel and shutter in the main channel.
Figure 3:
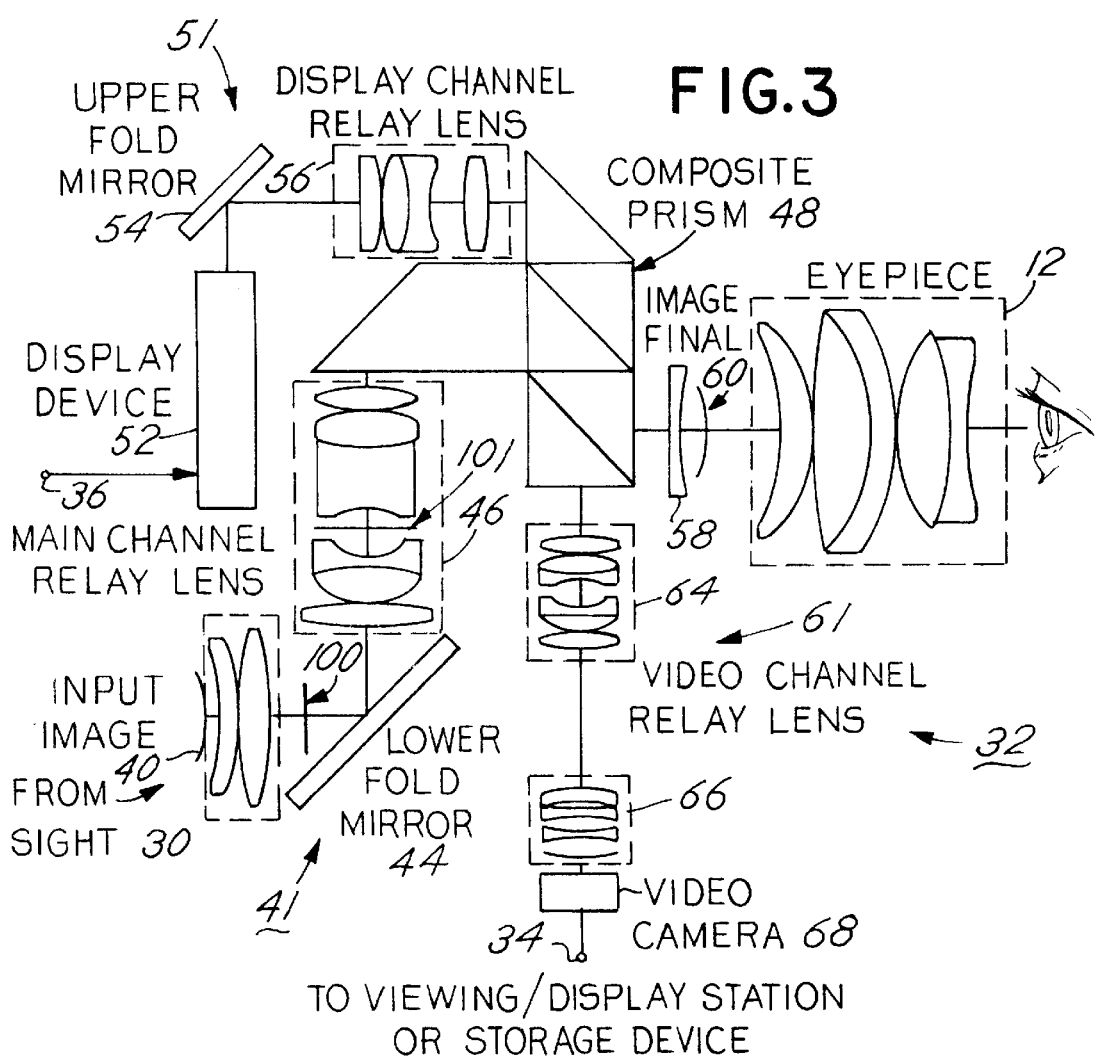
FIG. 3 is a schematic of the optical components housed within the extended vision module of FIG. 2 and showing their relation to the optical sight and the eyepiece.

FIG. 3 is an optical schematic of a preferred embodiment of the extended vision module 32. The final image as formed by the fire control optical system or sight 30 (FIG. 2) is represented by the curved line segment 40 at the lower left of FIG. 3. It is shown curved instead of planar since most simple optical sights are afflicted with field curvature in this focal surface. This curvature is, however, adequately handled by the eyepiece in the normal function of the sight. This primary sight image 40 is transmitted through a main or first optical channel 41 having a field lens assembly 42 and reflected from a lower fold mirror 44 upward into the main channel relay lens assembly 46. The main channel relay lens assembly 46 directs the main image into a composite, compound glass beam-combining prism 48. The composite prism 48 produces a final, relayed main image in the focal surface at 60 (also shown curved) after passing through field lens 58. The final image at 60 is viewed by the gunner via the eyepiece 12. The exit pupil of the eyepiece 12 is made accessible to the gunner where he will place his eye. The curvature in the final image 60 is adequately handled by the lenses in the eyepiece for viewing by the gunner.

The extended vision module 32 also includes a second or "CRT" channel, shown generally as numeral 51, for a directing a luminous image from the surface of an electronic display device 52 to the composite prism 48. The display device 52 may be a miniature CRT, a liquid crystal display, or other suitable device. A video signal is coupled through the input port 36 to the display device 52. The electronics module (not shown) provides electronic signals in known fashion to drive the display device 52. The luminous image on the surface of the display device 52 is directed by an upper fold mirror 54 through a display channel relay lens 56 and into the composite prism 48. The resulting image from the channel 51 is formed in the same vicinity as the primary sight image 60 where it is viewed by the gunner through the eyepiece 12. The final image viewed by the gunner is thus a superposition of the main image from the sight 40 and the auxiliary image generated by the display device 52.

The compound beam-combining prism 48 also combines the main and auxiliary images and introduces them into a third or video channel, indicated generally by reference numeral 61. This third channel 61 includes a video channel relay lens assembly 64, which transmits the combined image through a field lens assembly 66. The combined final image is transmitted to the focal plane of a suitable video camera 68 (e.g., a miniature two dimensional CCD array). The combined image is converted by the camera 68 into video signals in known fashion and conveyed to the video out port 34 in the extended vision module 32. The video out port 34 is coupled to a suitable cable for transmission of the video signal to a remote viewing or display system or storage device. In one possible embodiment, the video image is conveyed to a head mounted display worn by, for example, the commander of the weapon system. In another possible embodiment, the video image is displayed on a monitor (such as a conventional CRT). In another possible embodiment, the image is displayed on a liquid crystal display. In yet another possible embodiment, the image is conveyed from the port 34 to a storage device for future use or to a real-time display device.

In yet another possible embodiment, the video signal may be uplinked to a satellite to provide information to facilitate a strike from the air (or other remote location) at the same target. Additional information regarding the gunner's vehicle and target location may be uplinked to aid the airborne platform, encoded with the video. For example, the vehicle in which the extended vision module is installed may have a suitable satellite antenna and communications software to allow the video signal, and encoded information as to the gunner's vehicle (e.g., GPS or global positioning system coordinates, vehicle type, missile information, etc.), to be transmitted by satellite to the aircraft.

Figure 4:
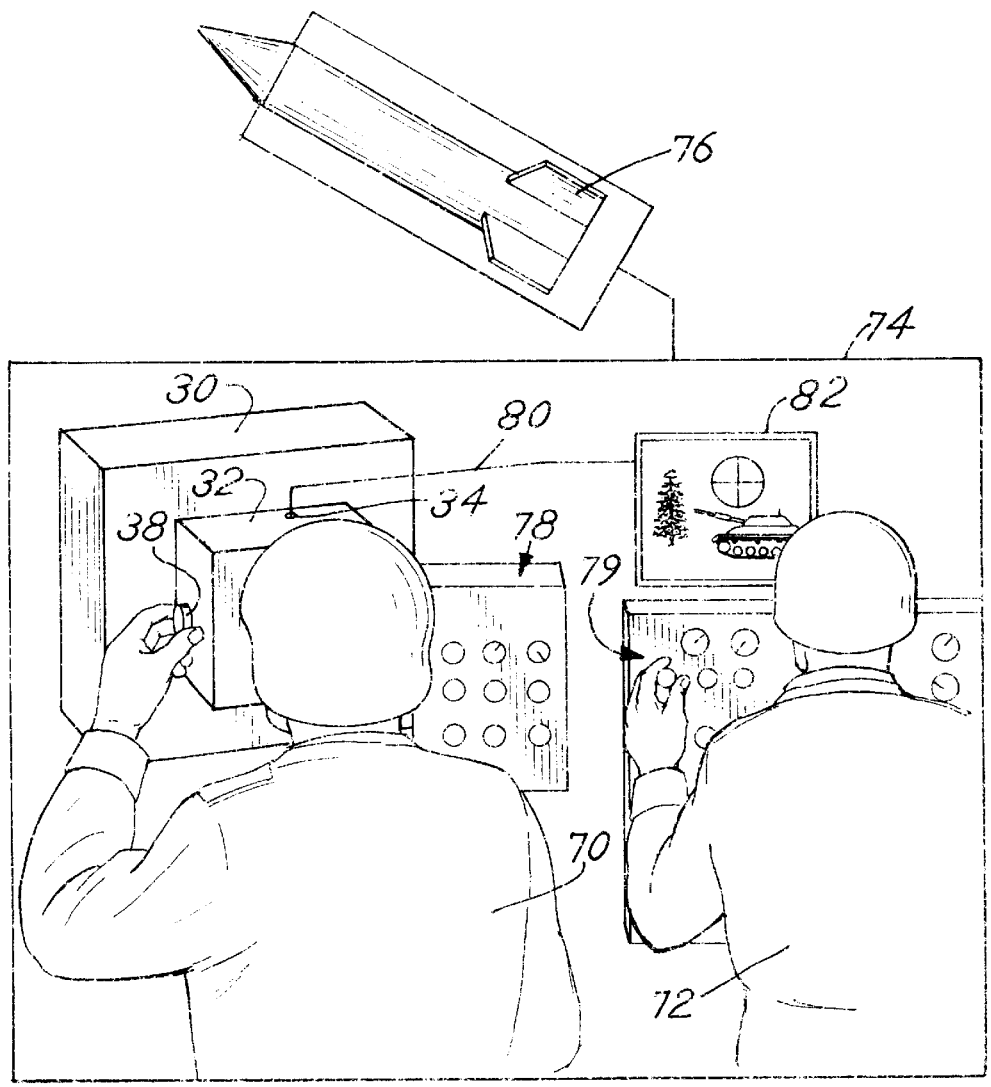
FIG. 4 is an illustration of one typical scenario in which the extended vision module may be used, showing the transmission of a video signal representing the final image generated in the extended vision module to a remote display for a commander of the weapon system, with the commander seeing the same view as that of the gunner through the eyepiece, whereby the commander may exercise remote fire control over the weapon system.

In a typical application for the invention, shown in FIG. 4, the extended vision module 32 is installed on a sight for a vehicle-mounted surface-to-surface missile 76. The eyepiece display may be viewed by the gunner 70. The Commander 72, who may also be present in the vehicle 74, may also view the same image as seen by the gunner (the combined image produced by the display device 52 and the input image 40 from the sight) by means of a head mounted display, not shown, or a conventional CRT screen or flat panel display 82 coupled to the extended vision module by cable 80. If the gunner 70 locks onto a target and is about to launch the missile at an incorrect target (for example, a friendly or non-hostile target), the commander 72 may abort the launch of the missile by operating fire control instruments 79 in the vehicle. The video image may also be transmitted to a remote commander via a suitable TV or other transmission system in the vehicle. The system of FIGS. 3 and 4 is particularly useful for training purposes. The electronics module can be programmed such that training video is presented to the gunner via the display device 52 and eyepiece 12. The commander or trainer can thus watch the gunner's performance in tracking the target and operating the fire control equipment for the weapon live, standing right next to the gunner. Immediate feedback on the performance of the gunner is possible. The gunner's performance can also be saved on tape by the storage device coupled to the video output port 34 for later critique and evaluation.

The auxiliary image conveyed in the second channel 51 (FIG. 3) may be virtually anything. Examples are a reticle, a natural picture or scene, or a programmed training image. The introduction of small ranging reticles will allow the gunner to determine the range to the target. Operator adjustment of bounding frame markers on the image of a target, at known optical magnification, can yield the distance to a target of known dimensions. In this manner, the range to target may be determined passively and without the use of active devices such as laser range finders.

In another possible embodiment of the invention, the display device 52 may be a color liquid crystal display. Small CRT's, although offering a bright image, cannot, at the present state of the art, produce colored imagery without a significant loss of resolution. On the other hand, liquid crystal display technology offers a full color display of good resolution, but at a relatively reduced luminance. Consequently, the liquid crystal display image may be diluted when superimposed upon a bright main image. To correct for this phenomenon when a relatively low luminance display is chosen for the display device such as a LCD, a variable optical density device is installed in the main or first channel 41 to reduce the transmittance of the main image. For example, an optical glass wheel 100 with varying levels of optical density in the azimuthal direction but constant in density in the radial direction is installed in the main channel 41 between the main channel field lens group 42 and the lower fold mirror 44. The gunner rotates the wheel 100 by actuating the knob 38 until a satisfactory reduction in transmittance of the main input image 40 occurs. The rotation of the wheel 100 varies the effective transmittance of the image 40 through the relay lens 46 to thereby adjust the relative luminance of the main image 40 versus the liquid crystal image produced at the surface of the display device 52, and offer good visibility of both images.

The use of such a wheel 100 with one portion thereof having a very high optical density region (essentially opaque) can act as a mechanical shutter. Alternatively, a solenoid-actuated mechanical shutter 101 (See FIG. 3A) can be placed in the main channel 41 to stop the main channel light. In either embodiment, the filter wheel or shutter should have a fail-safe feature which allows the shutter to remain open in case of electrical power failure. The placement of the shutter relative to the other components in the channel 41 is a matter of design choice, and may be for example in the central space between the lens elements of the main channel relay lens 46.

In constructing the extended vision module 32 of FIG. 3, it is important to have the camera relay lens 64 produce a quite flat final image on the focal plane of the video camera 68. Optical devices, such as telescopes, which are viewed by the eye are quite tolerant of image aberrations such as curvature of field and astigmatism. However, in the case of a camera, the final image must be made quite flat so that the image may be received onto the plane of the camera in-focus everywhere. Excessive non-flatness will introduce a defocus blur and reduce the resolution in the relayed image. Again, this choice of optical elements to produce the required degree of flatness in the video channel (assuming an input image of substantial curvature) is within the ability of a person skilled in the art of optical design.

It will thus be appreciated that we have described an extended vision module 32 for retrofit installation onto an optical sight 30 of a weapon system, the optical sight 30 including an eyepiece 12. The module comprises (a) a first optical channel 41 for receiving an input image 40 from the optical sight 30 at the location where the eyepiece 12 is normally located in the optical sight;

(b) a composite prism 48 receiving the input image from the first optical channel 41;

(c) a second optical channel 51 comprising (1) a luminous display device 52 and (2) a means 54, 56 for directing and reimaging a luminous image displayed by the display device 52 to the composite prism 48;

(d) the composite prism 48 combining the image 40 from the first optical channel 41 and the final luminous image from the second optical channel 51 to form a final composite image 60 viewable at the eyepiece 12 after it has been reinstalled on the module 32;

(e) the composite prism further directing a replica of the final composite image 60 to a third optical channel 61, the third optical channel comprising (1) a video camera 68 and (2) a lens assembly 64, 66 for transmitting a replica of the final composite image 60 onto the video camera 68, with the video camera 68 generating a signal representing the final composite image. The video camera is coupled to an output means, e.g., port 34, for enabling transmission of the video signal to a remote location; and (f) a housing 33 for the first, second and third optical channels and the composite prism, the housing 33 adapted for mounting to the optical sight 30 at the location of the eyepiece 12 after removal of the eyepiece, with the housing 33 further comprising a means, such as a suitable aperture and retaining screws, for receiving the sight eyepiece.

The composite prism 48 simultaneously provides the final image 60 to an operator of the weapon system at the eyepiece and to a camera generating a video signal for transmission of the final image to a host viewing system, e.g., a head mounted display worn by a commander or trainer, remote from the eyepiece 12, whereby the performance of the optical sight and weapon system may be enlarged and enhanced.

It will also be appreciated that we have also described an improved weapon system comprising a weapon (e.g., missile 76 or other armament), having an electronics module for generating missile aiming or point of regard information. The aiming or point of regard information may be either a reticle, video coming from the weapon, or other information, such as described in the prior art Lecuyer et al. U.S. Pat. No. 4,771,861. The weapon system includes a sight 30 presenting to a gunner an input image of the point of regard of the weapon; and a retrofit extended vision module 32 adapted to be installed onto the sight and comprising a means 42, 44, 46 for receiving an input image from the sight, a means 52, 54, 56 for generating a second image, and means 68 for generating a video signal of an image of a target within a field of view of the sight. The retrofit extended vision module provides a video output at 34 coupled from the camera 68 for enabling the video signal to be conveyed to a display 82 of a remote viewing system (see FIG. 4), and a suitable aperture or other means for receiving the eyepiece 12 for viewing of the final image by an operator of the weapon system. A commander having access to controls for the missile or other armament may view the video signal on the remote viewing system display and exercise fire control over the missile or other armament.

Presently preferred embodiments have been described in detail. Persons skilled in the art will appreciate that various modifications and alterations from the details of the disclosed embodiments may be made without departure from the scope and spirit of the invention. For example, there may be a need to modify the mechanical or optical components of the extended vision module in order to meet particular space constraints or optical characteristics of the sight in question. Further, the terms "weapon", "missile" or "missile system", as used herein, are intended to be interpreted broadly to encompass both ballistic and non-ballistic types of ammunition, conventional artillery weapons, anti-tank or anti-aircraft types of weapons, and other weapons launching a projectile and having a sight system and eyepiece for the gunner. This true scope and spirit of the invention is set forth in the appended claims, to be interpreted in light of the foregoing.

What is claimed is:

1. An extended vision module for retrofit installation onto an existing optical sight of a weapon system, said optical sight including an eyepiece, comprising:

(a) a first optical channel for receiving an input image from said optical sight at the location where said eyepiece is normally located in said optical sight;

(b) an optical combining means for receiving said input image from said first optical channel;

(c) a second optical channel comprising (1) a luminous display device and (2) a means for directing a luminous image displayed by said display device to said optical combining means;

(d) said optical combining means combining said image from said first optical channel and said luminous image from said second optical channel to form a composite final image;

(e) said optical combining means further directing said composite final image to a third optical channel, said third optical channel comprising (1) a video camera and (2) a lens assembly for forming said final image onto said video camera, said video camera generating a video signal of said final image, and said video camera coupled to an output means for enabling transmission of said video signal to a remote location; and (f) a housing for said first, second and third optical channels and said optical combining means, said housing adapted for mounting to said optical sight at the location of said eyepiece after removal of said eyepiece, said housing further comprising a means for receiving said eyepiece;

(g) wherein said extended vision module simultaneously provides said final image to an operator of said weapon system at said eyepiece and a video signal of said final image for transmission to a host viewing system remote from said eyepiece, whereby the performance of said optical sight and weapon system may be extended and enhanced.

2. The extended vision module of claim 1, wherein said luminous display device comprises a cathode ray tube.

3. The extended vision module of claim 1, wherein said luminous display device comprises a liquid crystal display.

4. The extended vision module of claim 3, wherein said first optical channel includes an adjustable variable density optical filter enabling a user of said sight to adjust the relative luminance of said input image.

5. The extended vision module of claim 4, wherein said adjustable variable density optical filter includes an optical glass wheel with varying levels of optical density.

6. The extended vision module of claim 1, wherein said video signal is ported to a commander for said weapon system.

7. The extended vision module of claim 1, wherein said luminous image comprises a training image.

8. The extended vision module of claim 7, wherein said video signal is ported to a display remote from said weapon system for viewing by a trainer.

9. The extended vision module of claim 7, wherein said video signal is ported to a storage device for storing of said video signal.

10. The extended vision module of claim 1, wherein said weapon system comprises a vehicle-mounted surface-to-surface or surface-to-air missile system.

11. The extended vision module of claim 1, wherein said video signal is up-linked to a satellite for transmission to said host viewing system.

12. The extended vision module of claim 11, wherein said host viewing system is located in an airborne vehicle and wherein said video signal further includes coded information regarding said weapon system.

13. An improved weapon system comprising:

a weapon having an electronics module for generating aiming point of regard or electronic image information;

a sight presenting to an operator of said weapon an input image including the point of regard of said weapon said input image comprising an optical image and image information from said electronics module said input image normally presented at an eyepiece for said sight; and a retrofit extended vision module adapted to be installed onto said sight said retrofit extended vision module comprising a means for receiving said input image from said sight at the location of said eyepiece of said sight, and a luminous device generating a luminous image, said retrofit extended vision module combining said input image with said luminous image to form a composite final image;

said retrofit extended vision module further comprising a camera generating a video signal of said composite final image, a video signal port enabling said video signal to be conveyed to a display of a remote viewing system, and an eyepiece holder receiving said eyepiece for viewing of said composite final image by said operator of said weapon;

whereby a commander having access to controls for said weapon may view a display image corresponding to said video signal on said remote viewing system display and exercise remote fire control over said weapon.

14. The improved weapon system of claim 13, wherein said retrofit extended vision module further comprises a first optical channel for transmission of said input image and a second optical channel, said second optical channel comprising a liquid crystal display, and a combining prism for combining said input image with an image displayed on said liquid crystal display.

15. The improved weapon system of claim 14, wherein said first optical channel comprises an adjustable variable density optical filter enabling said operator of said weapon to adjust the relative luminance of said input image.

16. The improved weapon system of claim 15, wherein said adjustable variable density optical filter comprises an optical glass wheel with varying levels of optical density.

17. The improved weapon system of claim 13, wherein said weapon comprises a vehicle-mounted surface-to-surface or surface-to-air missile system.

18. The improved weapons system of claim 13, wherein said display comprises a flat panel display.

19. The improved weapon system of claim 13, wherein said display comprises a head or helmet-mounted display.

20. The improved weapon system of claim 13, wherein said display comprises a cathode ray tube.

21. The improved weapon system of claim 13, wherein said display and said weapon system are both installed in a ground-based military vehicle.

22. The improved weapon system of claim 13, wherein said video signal is up-linked to a satellite for transmission to a remote location.

23. The improved weapon system of claim 22, wherein said remote location comprises an airborne vehicle and wherein said video signal further includes coded information regarding said weapon system.

* * * * *